US010665071B2

(12) United States Patent
Burke et al.

(10) Patent No.: US 10,665,071 B2
(45) Date of Patent: May 26, 2020

(54) SYSTEM AND METHOD FOR DEADZONE DETECTION IN SURVEILLANCE CAMERA NETWORK

(71) Applicant: Sensormatic Electronics, LLC, Boca Raton, FL (US)

(72) Inventors: Anthony Burke, Noblesville, IN (US); Peter Joseph Birkel, Noblesville, IN (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 712 days.

(21) Appl. No.: 15/076,705

(22) Filed: Mar. 22, 2016

(65) Prior Publication Data

US 2017/0278366 A1 Sep. 28, 2017

(51) Int. Cl.
*G08B 13/19* (2006.01)
*G08B 13/196* (2006.01)
(Continued)

(52) U.S. Cl.
CPC ... *G08B 13/19641* (2013.01); *G06K 9/00771* (2013.01); *G06T 7/292* (2017.01);
(Continued)

(58) Field of Classification Search
CPC ........ G08B 13/19641; G08B 13/19656; G08B 13/19684; G06T 7/292; G06T 2207/10016;
(Continued)

(56) References Cited

U.S. PATENT DOCUMENTS 3,217,098 A 11/1965 Oswald
4,940,925 A 7/1990 Wand et al.
(Continued)

FOREIGN PATENT DOCUMENTS

EP   2 164 003 A1   3/2010
EP   2 538 672 A1   12/2012
(Continued)

OTHER PUBLICATIONS

International Search Report and the Written Opinion of the International Searching Authority, dated May 31, 2017, from International Application No. PCT/US2017/023430, filed Mar. 21, 2017. Fourteen pages.

(Continued)

*Primary Examiner* — Manav Seth
(74) *Attorney, Agent, or Firm* — HoustonHogle LLP (57) ABSTRACT

A system and method for deadzone detection in a surveillance camera network is disclosed. In a preferred embodiment, a mobile user device held by an installer is moved through one or more critical paths within the premises while surveillance cameras of the network are capturing image data of the premises. An analytics system then tracks the installer/user device through the image data over the time interval for the critical path definition, and locates deadzones based on position information of the premises along the critical path and absence of installer/user device in the image data over the time interval. In another embodiment, an analytics system identifies individuals within image data captured from the cameras, tracks movement of the individuals across the fields of view of the cameras represented by the image data, and infers deadzones based on tracking the individuals and deadzone times calculated for each of the individuals.

12 Claims, 6 Drawing Sheets

(51) Int. Cl.
*G06T 7/292* (2017.01)
*G06K 9/00* (2006.01)
*H04N 7/18* (2006.01)

(52) U.S. Cl.
CPC . *G08B 13/19656* (2013.01); *G08B 13/19684* (2013.01); *H04N 7/181* (2013.01); *G06T 2207/10016* (2013.01); *G06T 2207/30196* (2013.01); *G06T 2207/30232* (2013.01)

(58) Field of Classification Search
CPC .......... G06T 2207/30196; G06T 2207/30232; G06K 9/00771; H04N 7/181
See application file for complete search history.

(56) References Cited

U.S. PATENT DOCUMENTS

| | | | |
|---|---|---|---|
| 5,164,827 A | 11/1992 | Paff | |
| 5,204,536 A | 4/1993 | Vardi | |
| 5,317,394 A | 5/1994 | Hale et al. | |
| 5,729,471 A | 3/1998 | Jain et al. | |
| 5,850,352 A | 12/1998 | Moezzi et al. | |
| 5,940,538 A | 8/1999 | Spiegel et al. | |
| 5,951,695 A | 9/1999 | Kolovson | |
| 5,969,755 A | 10/1999 | Courtney | |
| 6,341,183 B1 | 1/2002 | Goldberg | |
| 6,359,647 B1 | 3/2002 | Sengupta et al. | |
| 6,581,000 B2* | 6/2003 | Hills ................. | G01C 21/12 340/988 |
| 6,643,795 B1 | 11/2003 | Sicola et al. | |
| 6,724,421 B1 | 4/2004 | Glatt | |
| 6,812,835 B2 | 11/2004 | Ito et al. | |
| 6,970,083 B2 | 11/2005 | Venetianer et al. | |
| 7,091,949 B2 | 8/2006 | Hansen | |
| 7,242,423 B2 | 7/2007 | Lin | |
| 7,286,157 B2 | 10/2007 | Buehler | |
| 7,342,489 B1 | 3/2008 | Milinusic et al. | |
| 7,382,244 B1 | 6/2008 | Donovan et al. | |
| 7,409,076 B2 | 8/2008 | Brown et al. | |
| 7,428,002 B2 | 9/2008 | Monroe | |
| 7,450,735 B1 | 11/2008 | Shah et al. | |
| 7,456,596 B2 | 11/2008 | Goodall et al. | |
| 7,460,149 B1 | 12/2008 | Donovan et al. | |
| 7,529,388 B2 | 5/2009 | Brown et al. | |
| 7,623,152 B1 | 11/2009 | Kaplinsky | |
| 7,623,676 B2 | 11/2009 | Zhao et al. | |
| 7,733,375 B2 | 6/2010 | Mahowald | |
| 7,996,718 B1 | 8/2011 | Ou et al. | |
| 8,249,301 B2 | 8/2012 | Brown et al. | |
| 8,300,102 B2 | 10/2012 | Nam et al. | |
| 8,325,979 B2 | 12/2012 | Taborowski et al. | |
| 8,482,609 B1 | 7/2013 | Mishra et al. | |
| 8,483,490 B2 | 7/2013 | Brown et al. | |
| 8,502,868 B2* | 8/2013 | Buehler ........... | G08B 13/19693 348/143 |
| 8,558,907 B2 | 10/2013 | Goh et al. | |
| 8,594,482 B2 | 11/2013 | Fan et al. | |
| 8,675,074 B2 | 3/2014 | Salgar et al. | |
| 8,723,952 B1 | 5/2014 | Rozenboim | |
| 8,849,764 B1 | 9/2014 | Long et al. | |
| 8,995,712 B2 | 3/2015 | Huang et al. | |
| 9,015,167 B1 | 4/2015 | Ballou et al. | |
| 9,058,520 B2 | 6/2015 | Xie et al. | |
| 9,094,615 B2 | 7/2015 | Aman et al. | |
| 9,129,179 B1 | 9/2015 | Wong | |
| 9,158,975 B2 | 10/2015 | Lipton et al. | |
| 9,168,882 B1 | 10/2015 | Mirza et al. | |
| 9,197,861 B2 | 11/2015 | Saptharishi et al. | |
| 9,280,833 B2 | 3/2016 | Brown et al. | |
| 9,412,269 B2 | 8/2016 | Saptharishi et al. | |
| 9,495,614 B1 | 11/2016 | Boman et al. | |
| 9,594,963 B2 | 3/2017 | Bobbitt et al. | |
| 9,641,763 B2 | 5/2017 | Bernal et al. | |
| 9,674,458 B2 | 6/2017 | Teich et al. | |
| 9,785,898 B2 | 10/2017 | Hofman et al. | |
| 9,860,554 B2 | 1/2018 | Samuelsson et al. | |
| 9,965,680 B2 | 5/2018 | Burke et al. | |
| 9,967,446 B2 | 5/2018 | Park | |
| 2002/0104098 A1 | 8/2002 | Zustak et al. | |
| 2003/0107649 A1 | 6/2003 | Flickner et al. | |
| 2003/0169337 A1 | 9/2003 | Wilson et al. | |
| 2005/0012817 A1 | 1/2005 | Hampapur et al. | |
| 2005/0057653 A1 | 3/2005 | Maruya | |
| 2006/0001742 A1 | 1/2006 | Park | |
| 2006/0173856 A1 | 8/2006 | Jackson et al. | |
| 2006/0181612 A1 | 8/2006 | Lee et al. | |
| 2006/0239645 A1 | 10/2006 | Curtner et al. | |
| 2006/0243798 A1 | 11/2006 | Kundu et al. | |
| 2007/0178823 A1 | 8/2007 | Aronstam et al. | |
| 2007/0182818 A1* | 8/2007 | Buehler ........... | G08B 13/19602 348/143 |
| 2007/0279494 A1 | 12/2007 | Aman et al. | |
| 2007/0294207 A1 | 12/2007 | Brown | |
| 2008/0004036 A1 | 1/2008 | Bhuta et al. | |
| 2008/0101789 A1 | 5/2008 | Sharma | |
| 2008/0114477 A1 | 5/2008 | Wu | |
| 2008/0158336 A1 | 7/2008 | Benson et al. | |
| 2009/0237508 A1 | 9/2009 | Arpa et al. | |
| 2009/0268033 A1 | 10/2009 | Ukita | |
| 2009/0273663 A1 | 11/2009 | Yoshida | |
| 2009/0284601 A1 | 11/2009 | Eledath et al. | |
| 2010/0013917 A1 | 1/2010 | Hanna et al. | |
| 2010/0110212 A1 | 5/2010 | Kuwahara et al. | |
| 2010/0153182 A1 | 6/2010 | Quinn et al. | |
| 2010/0232288 A1 | 9/2010 | Coatney et al. | |
| 2011/0043631 A1 | 2/2011 | Marman et al. | |
| 2011/0128384 A1 | 6/2011 | Tiscareno et al. | |
| 2011/0246626 A1 | 10/2011 | Peterson et al. | |
| 2011/0289119 A1 | 11/2011 | Hu et al. | |
| 2011/0289417 A1 | 11/2011 | Schaefer et al. | |
| 2011/0320861 A1 | 12/2011 | Bayer et al. | |
| 2012/0072420 A1 | 3/2012 | Moganti et al. | |
| 2012/0098969 A1 | 4/2012 | Wengrovitz et al. | |
| 2012/0206605 A1 | 8/2012 | Buehler et al. | |
| 2012/0226526 A1 | 9/2012 | Donovan et al. | |
| 2013/0106977 A1 | 5/2013 | Chu | |
| 2013/0166711 A1 | 6/2013 | Wang et al. | |
| 2013/0169801 A1 | 7/2013 | Martin et al. | |
| 2013/0223625 A1 | 8/2013 | de Waal et al. | |
| 2013/0278780 A1 | 10/2013 | Cazier et al. | |
| 2013/0343731 A1 | 12/2013 | Pashkevich et al. | |
| 2014/0085480 A1 | 3/2014 | Saptharishi | |
| 2014/0172627 A1 | 6/2014 | Levy et al. | |
| 2014/0211018 A1 | 7/2014 | de Lima et al. | |
| 2014/0218520 A1 | 8/2014 | Teich et al. | |
| 2014/0282991 A1 | 9/2014 | Watanabe et al. | |
| 2014/0330729 A1 | 11/2014 | Colangelo | |
| 2014/0362223 A1 | 12/2014 | LaCroix et al. | |
| 2015/0039458 A1 | 2/2015 | Reid | |
| 2015/0092052 A1 | 4/2015 | Shin et al. | |
| 2015/0121470 A1 | 4/2015 | Rongo et al. | |
| 2015/0208040 A1 | 7/2015 | Chen et al. | |
| 2015/0215583 A1 | 7/2015 | Chang | |
| 2015/0244992 A1 | 8/2015 | Buehler | |
| 2015/0249496 A1 | 9/2015 | Muijs et al. | |
| 2015/0294119 A1 | 10/2015 | Gundam et al. | |
| 2015/0358576 A1 | 12/2015 | Hirose et al. | |
| 2015/0379729 A1 | 12/2015 | Datta et al. | |
| 2015/0381946 A1 | 12/2015 | Renkis | |
| 2016/0014381 A1 | 1/2016 | Rolf et al. | |
| 2016/0065615 A1 | 3/2016 | Scanzano et al. | |
| 2016/0224430 A1 | 8/2016 | Long et al. | |
| 2016/0225121 A1* | 8/2016 | Gupta ................. | G06T 3/00 |
| 2016/0269631 A1 | 9/2016 | Jiang et al. | |
| 2016/0357648 A1 | 12/2016 | Keremane et al. | |
| 2016/0379074 A1 | 12/2016 | Nielsen et al. | |
| 2017/0193673 A1 | 7/2017 | Heidemann et al. | |
| 2017/0277785 A1 | 9/2017 | Burke | |
| 2017/0277947 A1 | 9/2017 | Burke et al. | |
| 2017/0277967 A1 | 9/2017 | Burke et al. | |
| 2017/0278137 A1 | 9/2017 | Burke | |
| 2017/0278365 A1 | 9/2017 | Madar et al. | |
| 2017/0278367 A1 | 9/2017 | Burke et al. | |
| 2017/0278368 A1 | 9/2017 | Burke | |

(56) References Cited

U.S. PATENT DOCUMENTS

| | | |
|---|---|---|
| 2017/0280043 A1 | 9/2017 | Burke et al. |
| 2017/0280102 A1 | 9/2017 | Burke |
| 2017/0280103 A1 | 9/2017 | Burke et al. |
| 2018/0218209 A1 | 8/2018 | Burke et al. |

FOREIGN PATENT DOCUMENTS

| | | | |
|---|---|---|---|
| JP | 2003151048 A | | 5/2003 |
| JP | 2010074382 A | | 4/2010 |
| WO | 2007/030168 A1 | | 3/2007 |
| WO | 2013/141742 A1 | | 9/2013 |
| WO | 2014/114754 A1 | | 7/2014 |

OTHER PUBLICATIONS

International Search Report and the Written Opinion of the International Searching Authority, dated Jun. 12, 2017, from International Application No. PCT/US2017/023440, filed on Mar. 21, 2017. Fourteen pages.

International Search Report and the Written Opinion of the International Searching Authority, dated Jun. 19, 2017, from International Application No. PCT/US2017/023436, filed on Mar. 21, 2017. Fourteen pages.

International Search Report and the Written Opinion of the International Searching Authority, dated Jun. 21, 2017, from International Application No. PCT/US2017/023444, filed on Mar. 21, 2017. Thirteen pages.

International Search Report and the Written Opinion of the International Searching Authority, dated Jun. 28, 2017, from International Application No. PCT/US2017/023434, filed Mar. 21, 2017. Thirteen pages.

International Preliminary Report on Patentability, dated Oct. 4, 2018, from International Application No. PCT/US2017/023440, filed on Mar. 21, 2017. Eight pages.

International Preliminary Report on Patentability, dated Oct. 4, 2018, from International Application No. PCT/US2017/023434, filed on Mar. 21, 2017. Eight pages.

International Preliminary Report on Patentability, dated Oct. 4, 2018, from International Application No. PCT/US2017/023430, filed Mar. 21, 2017. Eight pages.

International Preliminary Report on Patentability, dated Oct. 4, 2018, from International Application No. PCT/US2017/023436, filed on Mar. 21, 2017. Eight pages.

International Preliminary Report on Patentability, dated Oct. 4, 2018, from International Application No. PCT/US2017/023444, filed on Mar. 21, 2017. Seven pages.

Weilin, L., et al., "Personalizaation of Trending Tweets Using Like-Dislike Caegory Model," Procedia Computer Science, 60: 236-245 (2015).

* cited by examiner

SYSTEM AND METHOD FOR DEADZONE DETECTION IN SURVEILLANCE CAMERA NETWORK

RELATED APPLICATIONS

This application is related to:

U.S. application Ser. No. 15/076,701 filed on Mar. 22, 2016, entitled "Method and system for surveillance camera arbitration of uplink consumption," now U.S. Patent Publication No. 2017-0278368 A1;

U.S. application Ser. No. 15/076,703 filed on Mar. 22, 2016, entitled "Method and system for pooled local storage by surveillance cameras," now U.S. Patent Publication No. 2017-0280102 A1;

U.S. application Ser. No. 15/076,704 filed on Mar. 22, 2016, entitled "System and method for designating surveillance camera regions of interest," now U.S. Patent Publication No. 2017-0277967 A1;

U.S. application Ser. No. 15/076,706 filed on Mar. 22, 2016, entitled "System and method for overlap detection in surveillance camera network," now U.S. Patent Publication No. 2017-0278367 A1;

U.S. application Ser. No. 15/076,708 filed on Mar. 22, 2016, entitled "System and method for retail customer tracking in surveillance camera network," now U.S. Patent Publication No. 2017-0278137 A1;

U.S. application Ser. No. 15/076,709 filed on Mar. 22, 2016, entitled "Method and system for modeling image of interest to users," now U.S. Patent Publication No. 2017-0277785 A1;

U.S. application Ser. No. 15/076,710 filed on Mar. 22, 2016, entitled "System and method for using mobile device of zone and correlated motion detection," now U.S. Patent Publication No. 2017-0280103 A1;

U.S. application Ser. No. 15/076,712 filed on Mar. 22, 2016, entitled "Method and system for conveying data from monitored scene via surveillance cameras," now U.S. Pat. No. 9,965,680;

U.S. application Ser. No. 15/076,713 filed on Mar. 22, 2016, entitled "System and method for configuring surveillance cameras using mobile computing devices," now U.S. Patent Publication No. 2017-0278365 A1; and U.S. application Ser. No. 15/076,717 filed on Mar. 22, 2016, entitled "System and method for controlling surveillance cameras," now U.S. Patent Publication No. 2017-0280043 A1.

All of the afore-mentioned applications are incorporated herein by this reference in their entirety.

BACKGROUND OF THE INVENTION

Surveillance camera systems are often deployed to collect image data within or around premises. Examples of premises include governmental buildings, office buildings, retail establishments, and single and multi-unit residences. The cameras are typically installed to monitor and detect individuals and/or activities at different locations in and around the premises.

A successful installation of surveillance camera systems requires careful consideration of several factors. The designers/installers select the locations at which to install the cameras, select the type of camera that is best suited for each location, and then position the cameras' fields of view to capture scenes at each location. For example, point of sale areas might require one or more ceiling mounted, dome style cameras to capture transaction-related activities within the locations. For monitoring large open areas such as shopping malls, open-floor plan offices, and parking lots, either panoramic view (e.g. "fish eye") cameras or pan-tilt-zoom (PTZ) cameras are often utilized because of each camera's ability to provide wider fields of view and to scan the areas, respectively. Designers/installers might also position the fields of view of different surveillance cameras to overlap, and also position the field of view of one camera to include another surveillance camera. These actions provide different views or perspectives of the same scene and the ability to capture attempts at tampering with the surveillance cameras.

Analytics systems are often part of surveillance camera systems. At a basic level, the analytics systems provide the ability to detect and track individuals and objects within the image data of the monitored scenes, Other capabilities include the ability to determine motion of objects relative to visual cues superimposed upon the image data and to search for specific behaviors of interest within the image data. The visual cues are often placed near fixed objects in the background scene of the image data to infer motion of objects relative to the visual cues. In one example, virtual tripwire visual cues can be located near entryways within the scene to detect entry or exit of individuals through the entryways and to provide a count of the individuals passing through the entryway over a specific time period. These analytics systems can provide both real-time analysis of live image data and forensic analysis of previously recorded image data.

A common problem when installing surveillance cameras is the potential for deadzones, which are areas in the premises that are not included within any of the fields of view of any of the cameras. These deadzones might result from improper positioning of the cameras and/or improper selection of the type of cameras installed. On the other hand, the existence of deadzones might simply be the consequence of a limited budget and the fact that deploying enough cameras to achieve total coverage is not feasible. At the same time, deadzones can result when there are obstructions present in the scenes of the cameras. Obstructions within the scenes such as pylons, bookcases, cubicle walls, file cabinets, and stairwells can cause areas behind the obstructions to be hidden from view. These deadzones remain unless additional cameras can be added that provide different views of the obstructed areas.

SUMMARY OF THE INVENTION

It would be beneficial to determine locations of deadzones during the installation of the surveillance cameras. In contrast, installers of current surveillance camera systems typically use an "educated guess" approach for installing surveillance cameras to provide the desired security coverage while also minimizing the presence of deadzones, where the experience of the installer is paramount to achieving this objective.

It would also be beneficial to infer the presence of deadzones from image data captured by the surveillance cameras. Such a capability enables operators to better understand image data from existing surveillance cameras installations and to better interpret that image data.

In general, according to one aspect, the invention features a method for determining deadzones for a network of surveillance cameras at a premises. The method comprises detecting motion within image data from the network of surveillance cameras and determining the deadzones within the premises. This determination can be performed in real-time or as post process.

In one embodiment, detecting motion within image data from the network of surveillance cameras comprises tracking a mobile user device and/or its installer as the mobile user device is moved along a critical path within the premises. For this purpose, the method further comprises collecting position information along the critical path during the tracking of the mobile user device and/or its installer, over a time interval.

The method also further comprises determining the deadzones within the premises by locating the deadzones based on the position information and absence of installer/user device in the image data over the time interval.

In one example, determining the deadzones within the premises comprises determining from the detected motion within the image data whether the mobile user device and/or its operator is included in the image data from at least one of the surveillance cameras. In another example, determining the deadzones within the premises comprises a mobile user device traversing a critical path within the premises, and determining from the detected motion within the image data whether the mobile user device and/or its operator is included in the image data from at least one of the surveillance cameras.

In another embodiment, detecting motion within image data from the network of surveillance cameras comprises identifying individuals within the image data and tracking the individuals across fields of view of the surveillance cameras represented by the image data. For this embodiment, in one example, determining the deadzones within the premises comprises inferring deadzones based on tracking individuals and deadzone times calculated for the individuals.

In one implementation, the method comprises mapping the deadzones on a floor plan of the premises and sending the floor plan of the premises including the mapped deadzones for display on the user device.

In general, according to another aspect, the invention features a method for determining deadzones for a network of surveillance cameras at a premises. The method comprises enabling an installer to define a critical path within a scene monitored by the surveillance cameras via a mobile user device carried by the installer. The method also comprises the surveillance cameras capturing image data of the scene during the definition of the critical path and transferring the image data to an analytics system. The analytics system then determines the deadzones from the image data.

In one example, the surveillance cameras capturing image data of the scene during the definition of the critical path comprises the surveillance cameras capturing image data along multiple positions of the path.

In another example, the method further comprises the mobile user device collecting position information along the critical path during the tracking of the mobile user device and/or its installer, over a time interval. The analytics system then determines the deadzones from the image data by locating the deadzones based on the position information and absence of installer/user device in the image data over the time interval.

In general, according to yet another aspect, the invention features a surveillance camera system. The system includes one or more surveillance cameras generating image data of a scene, a mobile user device, and an analytics system. The mobile user device is carried by a user that enables definition of a path within the scene. The analytics system receives the image data from the surveillance cameras and determines deadzones within the scene by determining whether the image data from at least one of the surveillance cameras includes the user.

Preferably, the analytics system is a remote analytics system that the one or more surveillance cameras access over a network cloud. The analytics system includes a map of a floor plan of the scene.

In general, according to still another aspect, the invention features a surveillance camera system. The system includes one or more surveillance cameras generating image data of a scene, and an analytics system. The analytics system receives the image data from the surveillance cameras and determines deadzones within the scene by interring deadzones based on tracking individuals and deadzone times calculated for the individuals.

In one example, the system further comprises a mobile user device that receives the map including the deadzones from the analytics system and displays the map on a display screen of the mobile user device.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms including the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
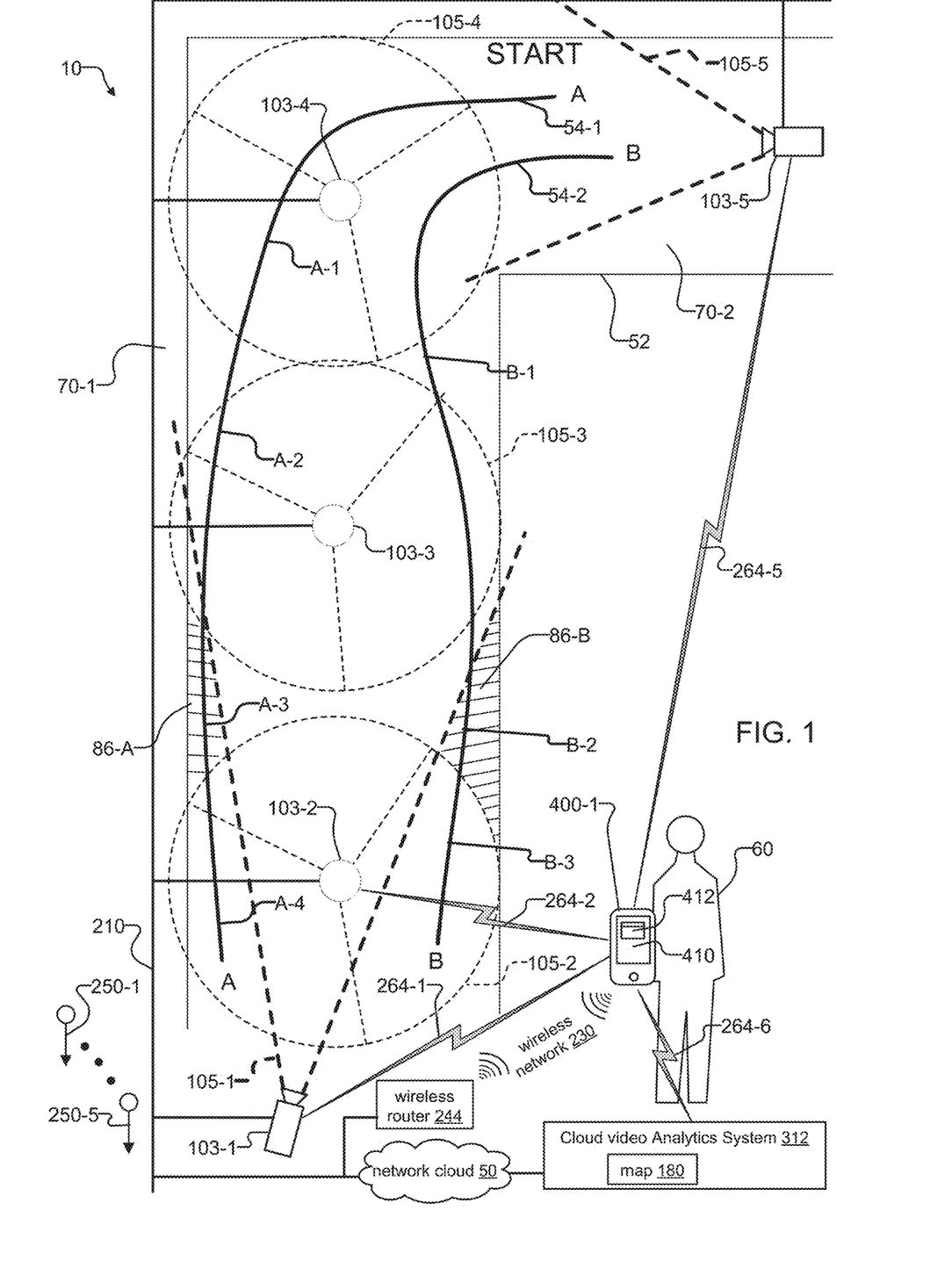
FIG. 1 is a schematic diagram showing mapping of deadzones for a network of surveillance cameras installed at a premises along with a mobile computing device that accesses image data from the surveillance cameras, where each of the surveillance cameras monitors a scene within the premises, and where the mobile computing device enables definition of a critical path within the premises for determining whether deadzones exist n the scenes monitored by the surveillance cameras.

FIG. 1 shows an exemplary surveillance camera system 10 to which the invention is applicable. Surveillance cameras 103-1 through 103-5 are installed as a network to monitor a corridor 70 within a premises 52, for example. Each of the cameras 103-1 through 103-5 has a field of view 105-1 through 105-5, respectively.

The surveillance cameras 103 communicate with each other over a local network 210 and with a cloud video analytics system 312 via a network cloud 50. Other types of analytics systems could be used such as analytics systems integrated into one or more of the surveillance cameras, an analytics system executing on a user mobile computing device 400, or an analytics system installed on the local network 210.

However implemented, the video analytics system 312 preferably includes or utilizes a map 180, which is an image representation of the area of the premises 52 under surveillance by the cameras 103 (e.g. the corridor 70). The installer 60 typically loads the map 180 onto the video analytics system 312 after initial installation of the cameras 103 but prior to analyzing the corridor 70 for deadzones 86. The map further preferably includes the locations of each of the cameras 103-1 through 103-5 of the network.

Each of the surveillance cameras 103-1 through 103-5 capture image data 250-1 through 250-5 of scenes within the fields of view 105-1 through 105-5 of the cameras, respectfully. The surveillance cameras 103 transmit their image data 250 over the network cloud 50 for analysis by the cloud video analytics system 312 or local or integrated analytics system to determine deadzones 86 between the scenes/fields of view 105 of the cameras 103. A wireless router 244 provides a wireless network 230 such as WiFi that enables exchange of wireless messages 264 between components. The wireless router 244 also has a local network interface that connects the wireless router 244 to the local network 210.

An installer 60 holds a user mobile computing device 400, also known as a user device, for communicating with the surveillance cameras 103 and the analytics system. Examples of user devices 400 include smartphones, tablet computing devices, and laptop computers running operating systems such as Windows, Android, Linux, or IOS, in examples. Each user device 400 includes a display screen or touch screen 410 and one or more applications 412, or "apps." The apps 412 execute upon the operating systems of the user devices 400.

The user devices 400 can exchange wireless messages 264 directly between each surveillance camera 103 and analytics system 312 for this purpose. Exemplary wireless messages 264-1, 264-2 and 264-3 between user device 400-1 and surveillance cameras 103-1, 103-2, and 103-5 are shown. The user device 400-1 can also exchange wireless messages 264-6 with the cloud video analytics system cloud 312, where the wireless router 244 forwards the messages 264-6 from and back to the cloud video analytics system 312 via the network cloud 50.

In some cases, the surveillance cameras 103 also transmit their image data 250 over the wireless network 230 to the user device 400 in the wireless messages 264 via the wireless router 244 or directly via peer-to-peer connections. Even Bluetooth or similar protocol could be used. The user device 400 receives the wireless messages 264, extracts the image data 250 therein, and forwards the image data 250 to its analytics system to determine deadzones 86 between the scenes/fields of view 105 of the cameras 103.

It is important to note that additional or different instantiations of the analytics system can exist in the system 10. In examples, the analytics system can be a separate system located on the same network 210 as the surveillance cameras 103, a process running on the user devices 400, or as a process integrated within one or more of the surveillance cameras 103, where the analytics system could be partially or completely executing on the surveillance cameras 103. For the latter example, one of the cameras 103 typically functions as a master in a master/slave relationship between the cameras 103. The remaining cameras 103 functioning as slaves in this relationship transmit their image data 250 over the network 210 for analysis by the integrated analytics system of the master surveillance camera 103.

Via the wireless messages 264, user device 400-1 sends instructions to configure the cameras 103 and access the image data 250 on the cameras 103. The wireless messages 264 include both control and data wireless messages. In one example, data wireless messages 264 include frames of image data 250 that the surveillance cameras 103 send to the user mobile computing devices 400.

A specific example showing how the cameras 103 might be deployed is illustrated. In the example, dome style cameras 103-2, 103-3 and 103-3 are mounted overhead to monitor a long section 70-1 of the corridor 70. Camera 103-1 is a fixed style camera mounted along a wall of the long section 70-1 such that its field of view 105-1 provides a side view of the same long section 70-1 monitored by the cameras 103-2, 103-3, and 103-4. To monitor a small section 70-2 of the corridor 70 that is at a right angle to the long section 70-1, a fixed style camera 103-5 mounted along a wall of the small section 70-2 is utilized.

Deadzones 86 can exist after installing the surveillance cameras 103. Exemplary deadzones 86-A and 86-B are shown. Deadzones 86-A and 86-B are regions in the long section 70-2 of the corridor 70 that are not included within any of the fields of view 105 of any of the surveillance cameras 103. One way that installers can determine and subsequently eliminate deadzones 86 is based on analysis of image data 250 of individuals 60 as they walk a "critical path" 54 through a monitored scene that is also defined within the map 180. Two critical paths "A" 54-1 and "B" 54-2 are defined to detect deadzones 86-A and 86-B, respectively. Exemplary positions A-1 through A-4 along path A and positions B-1 through 13-3 along path B are shown. A deadzone 86 likely exists when the installer 60 (or the user device 400-1 held by the installer 60) is not included within the field of view 105 of at least one surveillance camera 103, for each position along the path.

It is also important to note that the analysis of the image data 250 provided to the analytics system, such as the cloud system 312, a local analytics system, an analytics system executing on a surveillance camera and/or the user mobile computing device 400, can either be executed in real time, or in a forensics fashion. For the real time analysis, the analytics system(s) preferably receives the image data 250 over the local network 210 from the cameras 103 just after the cameras 103 capture the image data 250 of the scene. For the forensic analysis of the image data 250, the analytics system can analyze previously recorded image data 250 of the scene stored on a network video recorder 228, or image data 250 stored locally within the cameras 103, in examples.

Beginning at "START," the installer/user device first walks critical path A and encounters position A-1. When the installer 60 is at A-1, the installer 60 is included within the fields of view 105-4 and 105-1 of cameras 103-4 and 103-1, respectively. As a result, the analytics system 312 can deduce that no deadzone 86 exists near A-1. Similarly, no deadzone exists near A-2, because the installer 60 when at A-2 is included within both the fields of view 105-3 and 105-1 of cameras 103-3 and 103-1, respectively. Also, no deadzone exists near A-4, because the installer 60 when at A-4 is included within the field of view 105-1 of camera 103-1. However, when the installer 60 is at A-3, the installer 60 is not included within the field of view 105 of any surveillance camera 103. As a result, the analytics system 312 can deduce that there is a deadzone 86-A near A-3.

In a similar fashion, the installer/user device then walks critical path B, also beginning at "START." The analytics system 312, for example, can deduce that there are no deadzones 86 near positions B-1 and B-3 along path B, because the installer 60 is included within the field of view 105-1 of camera 103-1 when at B-1, and because the installer 60 is included within the field of view 105-2 of camera 103-2 when at B-3. However, when the installer 60 is at B-2, the installer 60 is not included within the field of view 105 of any surveillance camera 103. As a result, the analytics system 312 can deduce that there is a deadzone 86-B near B-2.

Figure 2:
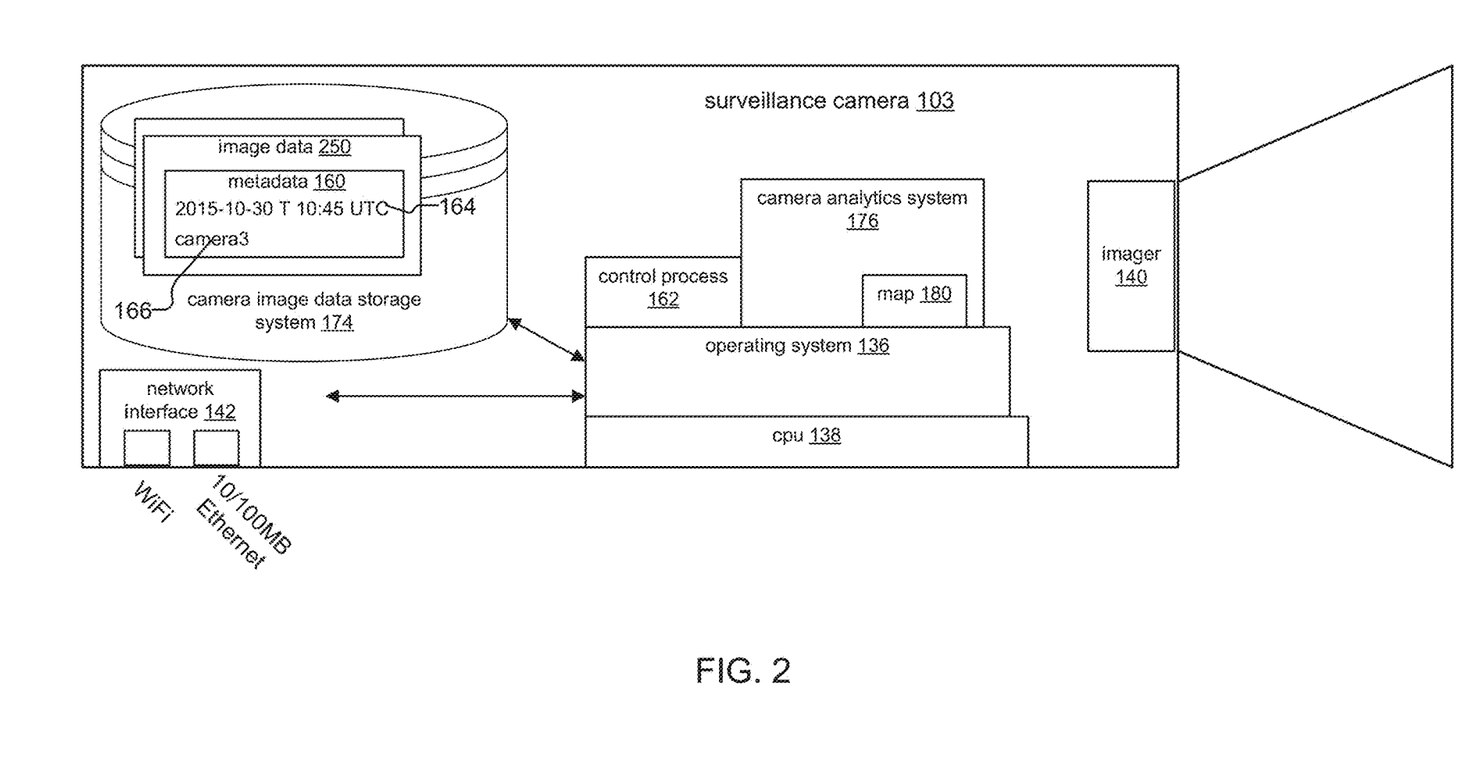
FIG. 2 is a schematic diagram showing some of the components of the surveillance cameras.

FIG. 2 shows some of the components of an exemplary surveillance camera 103.

The camera 103 includes a processing unit (CPU) 138, an imager 140, a camera image data storage system 174 and a network interface 142. An operating system 136 runs on top of the CPU 138. A number of processes or applications are executed by the operating system 136. One of the processes is a control process 162. In some embodiments, a camera analytics system 176 process is also included within one or more of the surveillance cameras 103 in the network 210. The camera analytics system 176 includes a map 180, which is an image representation of a floor plan for the area of the premises 52 for which the installer 60 configures the camera analytics system 176 for deadzone 86 analysis.

The camera 103 saves image data 250 captured by the imager 140 to the camera image data storage system 174. Each camera 103 can support one or more streams of image data 250. The control process 162 receives and sends messages 264 via its network interface 142. Each camera 103 also saves metadata 160 for the image data 250, including a timestamp 164 and camera number 166.

In other examples, the image data is stored off of the camera on other cameras and/or a local image data storage system.

During execution of the "installer method" disclosed embodiment for detecting deadzones 86, after the critical paths 54 are defined by the installer 60 holding the user device 400-1, the user device 400-1 requests information for the integrated camera analytics system 176 for analysis of potential deadzones 86. This information might include image data 250 collected over a time interval (e.g. for the time period in which the installer 60 traversed the path 54), position information collected by the user device 400 held by the installer 60 during the traversal of the path 54, FIG. 3 describes the preferred "installer method" that enables an analytics system 312 to determine deadzones 86 in real-time during installation of the surveillance cameras 103. The method is described by way of an example critical path 54 traversal by an operator within a monitored area, and provides details of interactions between major components of the surveillance camera system 10 both during and after traversal of the path 54 to determine likely deadzones 86.

Figure 3:
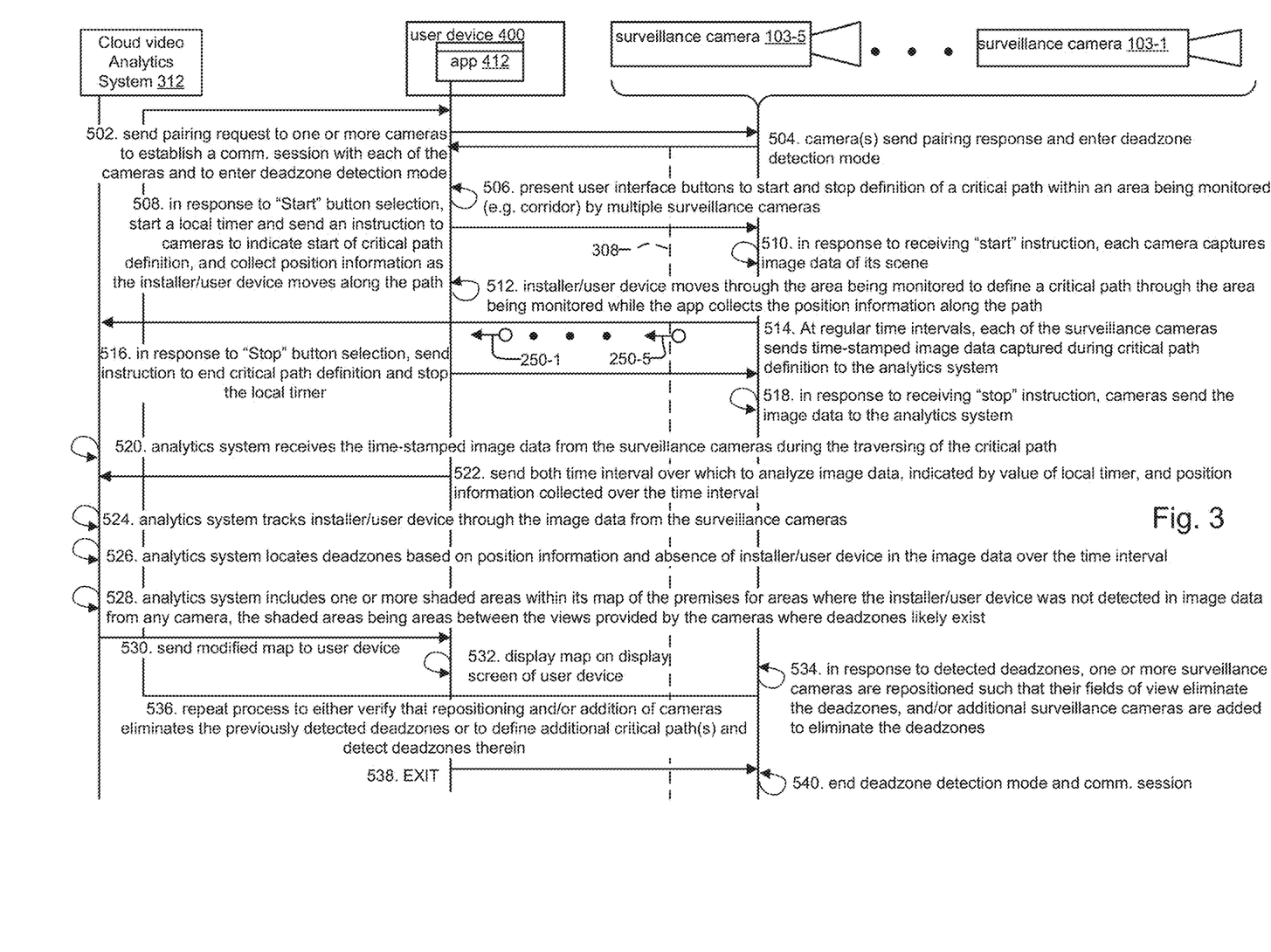
FIG. 3 is a sequence diagram showing the determination of deadzones during installation of the surveillance cameras using the mobile computing device.

In step 502, an app 412 running on the user device 400 sends a pairing request to one or more cameras 103 to establish a communications session 308 with each of the cameras 103 and for the surveillance cameras 103 to enter a deadzone detection mode. According to step 504, the cameras 103 send a pairing response message and enter deadzone detection mode. As a result of step 504, a communication session 308 is established between each of the cameras 103 currently in deadzone detection mode and the app 412. In step 506, the app 412 then presents user interface buttons to start and stop definition of a critical path 54 within an area being monitored (e.g. corridor 70) by multiple surveillance cameras 103.

According to step 508, in response to selection of a "Start" button on the user interface of the app 412 by the installer 60, the app 412 starts a local timer and sends an instruction to the cameras 103 to indicate start of critical path definition, and collects position information as the installer/user device moves along the critical path 54. The position information can be obtained by GPS or indoor GPS system or from an inertial system in the user device 400, in examples.

In step 510, in response to receiving the "start" instruction, each camera 103 captures image data 250 of its scene. Then, in step 512, the installer/user device moves through the area being monitored to define a critical path 54 through the area being monitored while the app 412 collects position information along the path 54.

In step 514, at regular time intervals, each of the surveillance cameras 103 sends time-stamped image data 250 captured during the definition of the critical path 54 to an analytics system. In one example, the analytics system is the cloud video analytics system 312 that the cameras 103 access using their local network 210 and the network cloud 50. In other examples, the analytics system is on the local network or integrated into one of the cameras 103.

According to step 516, in response to selection of a "stop" button on the user interface of the app 412 by the installer 60, the app 412 stops the local timer and sends an instruction to the cameras 103 to end definition of the critical path 54. In response to receiving the "stop" instruction, the cameras 103 send their remaining image data 250 to the analytics system, in step 518.

According to step 520, the analytics system receives the time stamped image data 250 from the surveillance cameras 103 during definition of the critical path 54. In step 522 the app 412 sends to the analytics system both the time interval over which to analyze the image data 250, given by the value of the local timer, and the position information that the app 412 collected over the time interval. The analytics system then tracks the installer/user device through the image data 250 from the surveillance cameras 103, in step 524.

In step 526, the analytics system locates deadzones 86 based on the position information and absence of the installer/user device within the image data 250 over the time interval. Then, in step 528, the analytics system includes one or more shaded areas within its map 180 of the premises 52 for areas where the installer/user device was not detected in image data 250 of any surveillance camera 103. The shaded areas are areas between the views provided by the cameras 103 where deadzones 86 likely exist. The analytics system sends the modified map 180 to the user device 400 in step 530.

In response, in step 532, the app 412 displays the map 180 on the display screen 410 of the user device 400. According to step 534, in response to detected deadzones 86, one or more surveillance cameras 103 are repositioned such that their fields of view 105 eliminate the deadzones 86. In addition, the installer 60 can install additional surveillance cameras 103 to eliminate the deadzones 86. In step 536, the installer 60 repeats this process to verify that the repositioning and/or addition of surveillance cameras 103 eliminates the previously detected deadzones 86 or to define additional critical path(s) 54 and detect deadzones 86 therein.

Finally, in step 538, the installer 60 exits the app 412, and each of the cameras 103 exit deadzone detection mode and end their communication sessions 308 with the app 412 in step 540.

Figure 4:
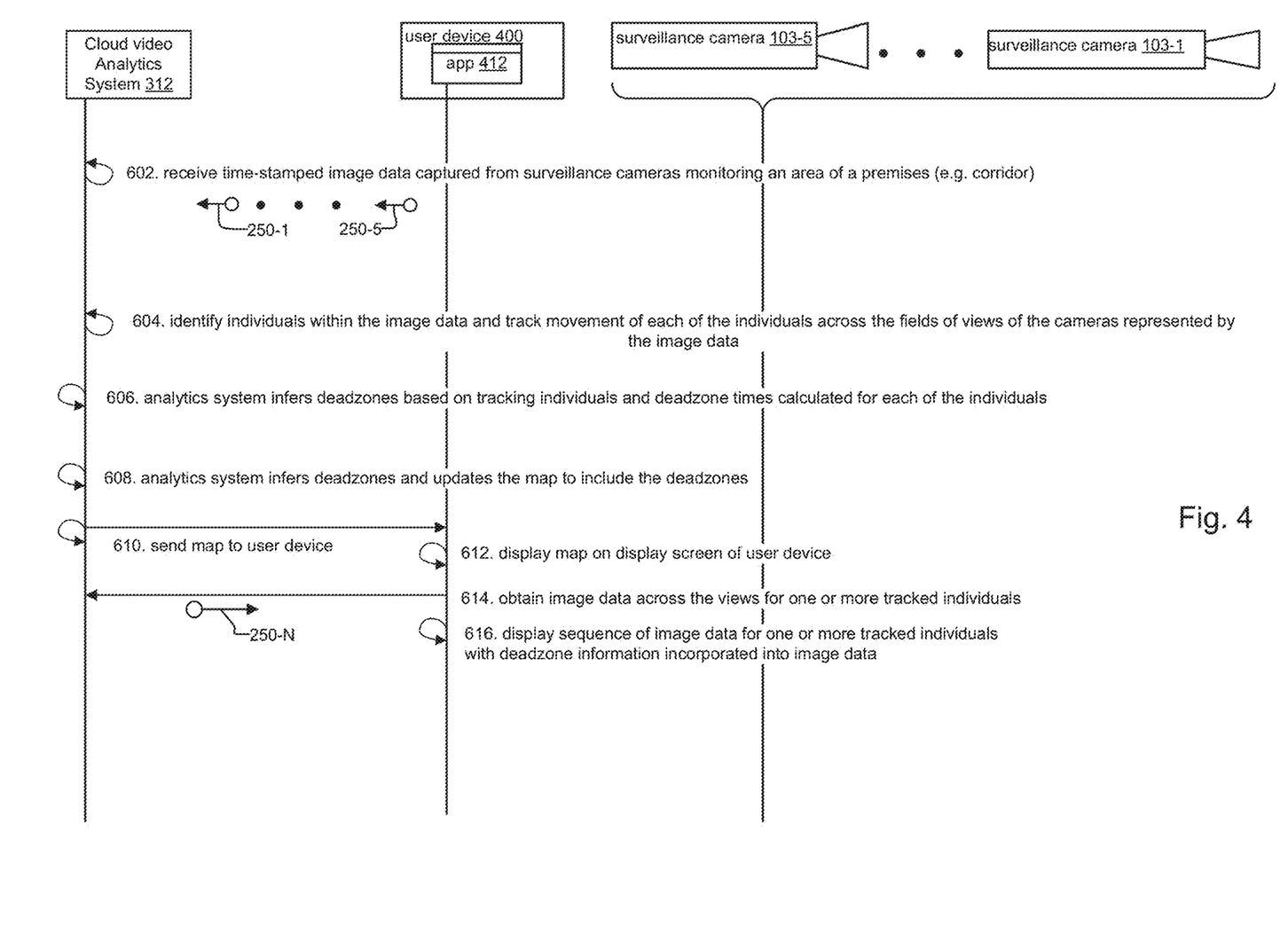
FIG. 4 is a sequence diagram showing a method for inferential determination of deadzones, where the deadzones are inferred from image data captured by the surveillance cameras.

FIG. 4 describes another method for detecting deadzones 86, where the deadzones 86 are inferred from image data 250 taken of the scene. In step 602, an analytics system (e.g. cloud, local or camera video analytics system 312) receives time stamped image data 250 captured from surveillance cameras 103 monitoring an area of a premises 52, such as the corridor 70 of FIG. 1. In one example, the image data 250 is received directly from the cameras 103 after the cameras capture the image data 250.

In step 604, the analytics system 312 identifies individuals within the image data 250 and tracks movement of each of the individuals across the fields of views 105 of the cameras 103 represented by the image data 250. In step 606, the analytics system infers deadzones 86 based on tracking individuals and deadzone times 87 calculated for each of the individuals.

A deadzone time 87 is the elapsed time from when a specific individual is last detected in image data 250 of any camera 103 at one point in time, and the next time that individual is detected in image data 250 of another camera 103. When fields of view 105 are optimally positioned to eliminate deadzones 86, for example, individuals 60 passing through a monitored area at a reasonably continuous rate will be represented by the analytics system as "blobs" within the image data 250, where the blobs appear to seamlessly exit one scene and enter another with minimal time delay (e.g. deadzone time 87) that is relatively consistent across all scenes of the cameras 103.

However, when there are deadzones 86, an individual could last be seen in image data 250 exiting a scene in the field of view 150 of one camera 103, but then "disappear" from view for a period of time. The next time the individual appears in the image data 250, the individual is exiting a scene in the field of view 150 of a different camera 103. As a result, the deadzone time 87 for this portion of the tracked individual's motion would be greater than that expected, from which location of a deadzone 86 may be inferred.

In step 608, the analytics system 312 infers deadzones 86 and updates the map 180 to include the deadzones 86. The analytics system then sends the map 180 to the user device 400 in step 610. The app 412 displays the map 180 on the display screen 410 of the user device 400. According to step 614, the user device 400 obtains image data 250 from the analytics system 312 across the views for one or more tracked individuals. In response, in step 616, the app 412 displays a sequence of image data 250 for one or more tracked individuals with deadzone information incorporated into the image data 250.

Figure 5:
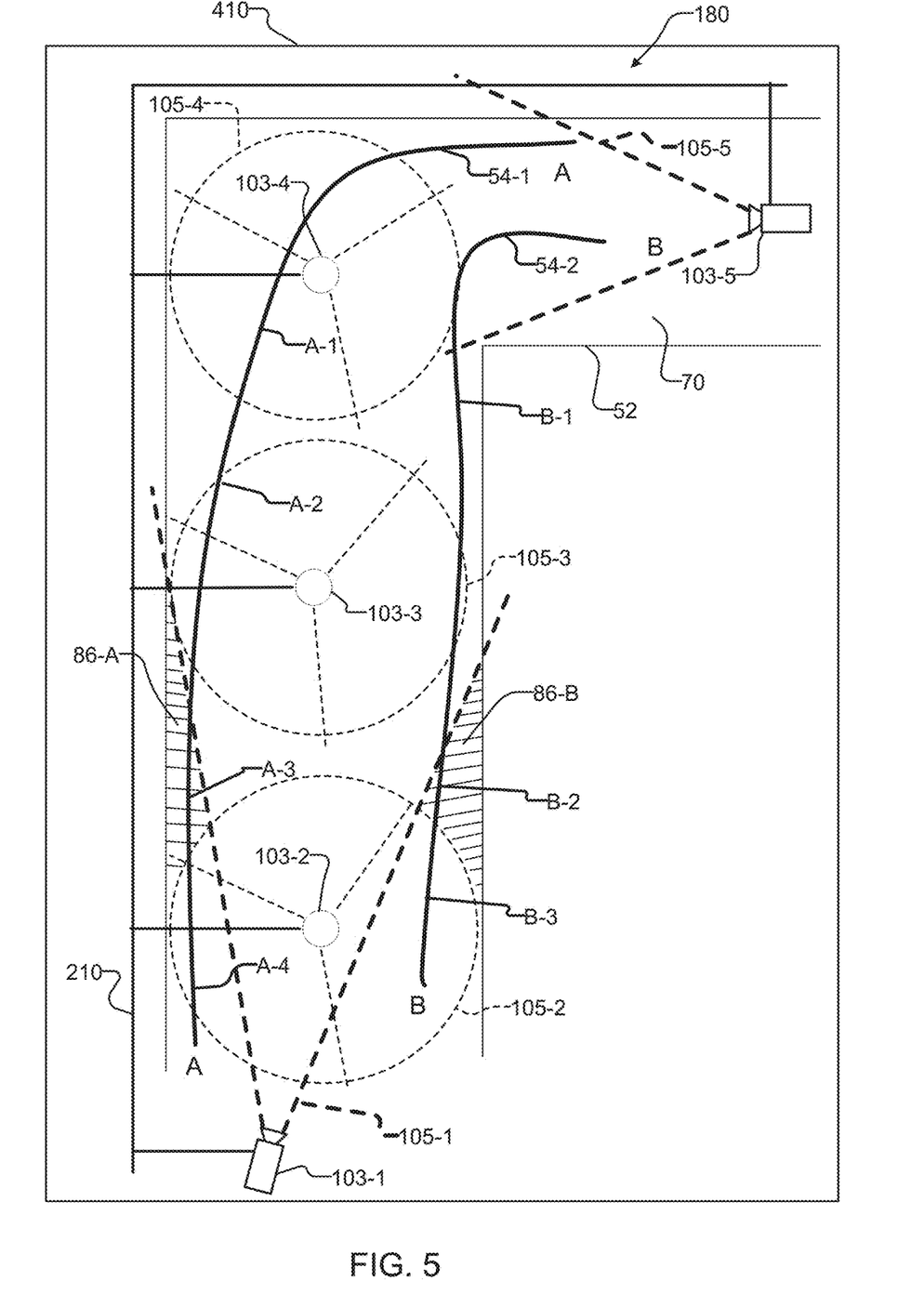
FIG. 5 shows a floor plan map of an area within a premises monitored by surveillance cameras, where the methods of FIG. 4 and FIG. 5 determine deadzones in the area monitored by the surveillance cameras, include the deadzones as shaded areas within the map, and present the map for display on a user device.

FIG. 5 shows an image representation of a map 180 of a monitored area rendered on a display screen 410 of a user device 400. The map 180 is for monitored area (e.g. corridor 70) of the premises 52 in FIG. 1. The map 180 has been modified by the deadzone detection methods of FIG. 3 and FIG. 4. The analytics systems of these methods were able to determine deadzones 86-A and 86-B in corridor 70, and highlighted the deadzones 86 graphically within the map 180 as shaded areas before sending the map 180 for display on the user device 400. This enables the installer 60 or operator to have an "at a glance" visual indication of deadzones 86 determined from the methods of FIG. 3 and FIG. 4.

Figure 6:
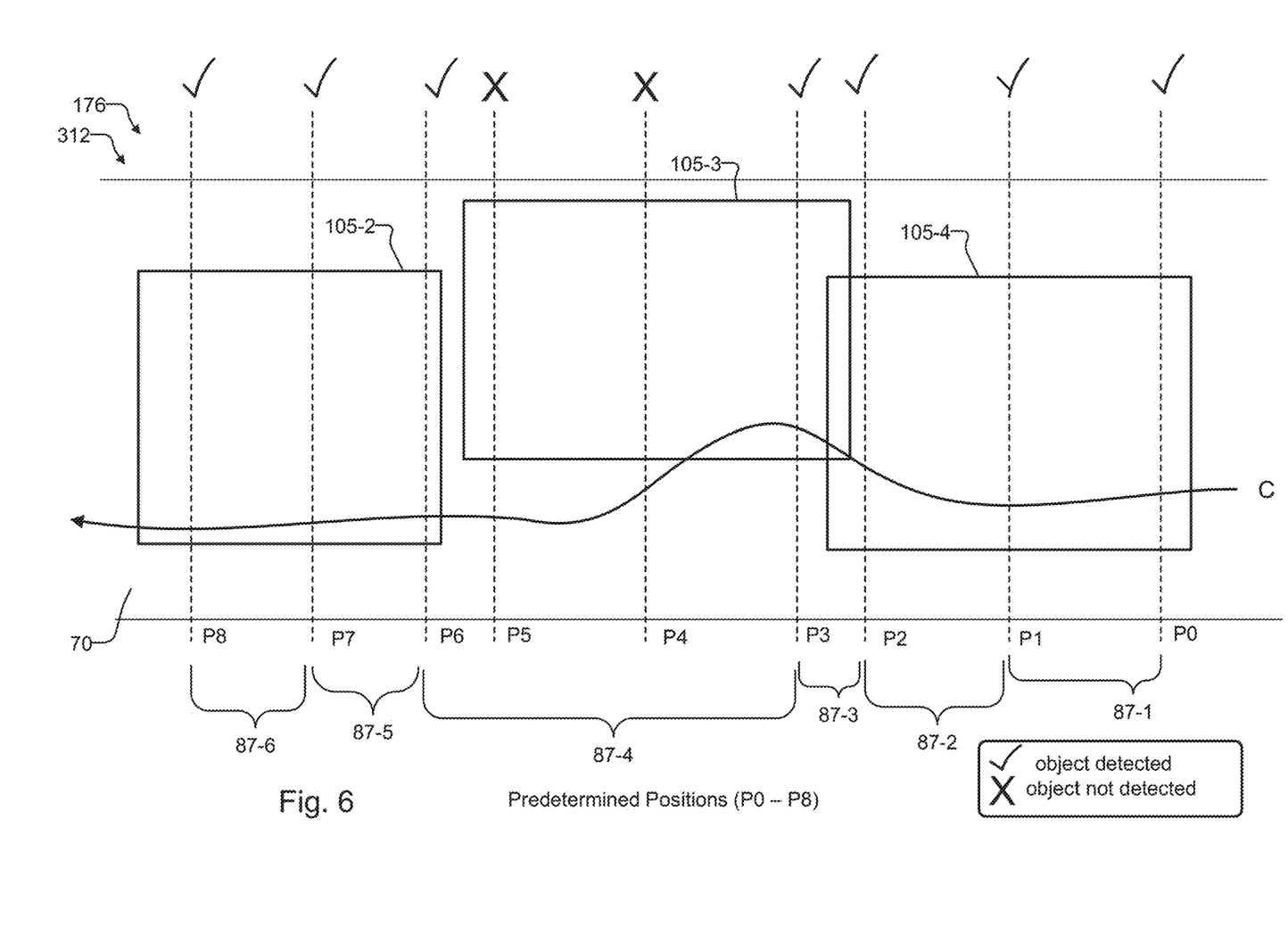
FIG. 6 is a schematic diagram showing how an analytics system utilized in the methods of FIG. 5 and FIG. 6 tracks objects across the fields of view of the surveillance cameras to determine deadzones among the views from an analysis viewpoint.

FIG. 6 shows a schematic representation of exemplary analysis method utilized by an analytics system, such the cloud system 312, a local analytics system, an analytics system executing on a surveillance camera and/or the user mobile computing device 400, to determine deadzones 86 in a monitored area (here, corridor 70 of a premises 52). The analytics system receives position information for a monitored area, image data 250 of the monitored area captured by surveillance cameras 103, and a time interval over which to track movement of one or more objects across the image data 250 relative to the position information. For the embodiment of FIG. 3, the object tracked is the installer/user phone moving through the scene, where reference "C" identifies the critical path 54 traversed by the installer/user device through the scene. For the embodiment of FIG. 4, the object tracked is a specific individual that the analytics system identifies and tracks through the scene, and reference "C" identifies the path that the specific individual traverses through the scene.

In the illustrated example, an installer 60 adjusts fields of view 105-2 through 105-5 of cameras 103-2 through 103-5 to monitor activities in a monitored area (e.g. corridor 70). The analysis method tracks movement of the object along path "C" through image data 250 captured by cameras 103-2 through 103-5 over the time interval, and calculates deadzone times 87 at positions P0 through P8. The positions are typically spaced apart at a similar distance and also are selected to include at least the leading and trailing edges of each of the fields of view 105 of the cameras 103.

The analytics system is configured by the installer 60 to detect the object in the fields of view 105 of the cameras 103 at positions P0-P8. The analytics system detects the object at positions P0 through P3, but does not detect the object at positions P4 and P5. Finally, the analytics system detects the object at positions P6 through P8. As a result, in one example, the analytics system can infer that there may be a deadzone 86 in the corridor 70 located near positions P4 and P5 of the premises 52. The analytics system then updates its map 180 to include the determined deadzones 86.

Now viewing the same example from the perspective of deadzone times 87, the analytics system determines reasonably consistent deadzone times 87-1 through 87-3 as the object traverses critical path "C" and crosses positions P0 through P3. Adjacent deadzone times 87 also include a common position as an endpoint, and each position is included as an endpoint in at least one deadzone time 87 calculation. For example, deadzone time 87-1 is associated with the time taken for the object to traverse along "C" from position P0 to P1, deadzone time 87-2 for position P1 to P2, and deadzone time 87-3 for position P2 to P3. As a result, the analytics system can infer that a deadzone 86 likely does not exist between the positions indicated by deadzone times 87-1 through 87-3 (i.e. positions P0 through P3).

After the object crosses position P3, however, the analytics system determines a much larger than expected deadzone time 87-4 occurring at positions near where the field of view 105-3 of camera 103-3 is positioned. In the example, the larger deadzone time 87-4 is associated with the time taken for the object to traverse along "C" and crossing positions P3 to P6. Positions P4 and P5 are not included as endpoints in any deadzone times 87. As a result, the analytics system can infer that a deadzone 86 likely exists somewhere between the positions indicated by the start and end times of deadzone time 87-4.

In a similar vein, after the object crosses position P6, the analytics system determines deadzones 87-5 and 87-6. Deadzone time 87-5 is associated with the time taken for the object to traverse along "C" from position P6 to P7, and deadzone time 87-6 for position P7 to P8. Because adjacent deadzone times 87-5 and 87-6 are consistent with that of deadzone times 87-1 through 87-3, include common position P7 an endpoint, and each position from P6 through P8 are included as an endpoint in at least one deadzone time 87 calculation, the analytics system can infer that a deadzone 86 likely does not exist between the positions indicated by deadzone times 87-5 and 87-6 (i.e. positions P6 through P8).

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for determining deadzones for a network of surveillance cameras, the method comprising:
    detecting motion within image data from the network of surveillance cameras by tracking a mobile user device and/or its installer as the mobile user device is moved along a critical path within a premises; and
    determining the deadzones for the network along the critical path based on the detected motion within the image data from the surveillance cameras and the tracked mobile user device and/or installer.

2. The method of claim 1, further comprising collecting position information along the critical path during the tracking of the mobile user device and/or its installer, over a time interval.

3. The method of claim 2, further comprising determining the deadzones within the premises by locating the deadzones based on the position information and absence of installer/user device in the image data over the time interval.

4. The method of claim 1, wherein determining the deadzones for the network comprises determining from the detected motion within the image data whether the mobile user device and/or its installer is included in the image data from at least one of the surveillance cameras.

5. The method of claim 1, wherein determining the deadzones for the network comprises:
    determining from the detected motion within the image data whether the mobile user device and/or its operator is included in the image data from at least one of the surveillance cameras.

6. The method of claim 1, wherein detecting motion within image data from the network of surveillance cameras comprises identifying individuals within the image data and tracking the individuals across fields of view of the surveillance cameras represented by the image data.

7. The method of claim 1, wherein determining the deadzones for the network comprises inferring deadzones based on tracking individuals and deadzone times calculated for the individuals.

8. The method of claim 1, further comprising mapping the deadzones on a floor plan of the premises and sending the floor plan of the premises including the mapped deadzones for display on the user device.

9. A surveillance camera system; comprising:
    one or more surveillance cameras generating image data of a scene;
    a mobile user device carried by a user that enables definition of a path within the scene; and
    an analytics system that receives the image data from the surveillance cameras and determines deadzones within the scene and along the path by determining whether the image data from at least one of the surveillance cameras includes the user.

10. The system of claim 9, wherein the analytics system is a remote analytics system that the one or more surveillance cameras access over a network cloud.

11. The system of claim 9, wherein the analytics system includes a map of a floor plan of the premises.

12. A surveillance camera system, comprising:
    surveillance cameras generating image data of a scene; and
    an analytics system that receives the image data from the surveillance cameras and determines deadzones among the surveillance cameras and along a path based on tracking individuals and deadzone times calculated for the individuals and determining whether the image data from the surveillance cameras includes the user, wherein the analytics system includes a map of a floor plan of the scene, and wherein the analytics system updates the map to include the deadzones; and
    a mobile user device that receives the map including the deadzones from the analytics system and displays the map on a display screen of the mobile user device, the mobile user device being carried by the user to define the path.

* * * * *